Sept. 2, 1969  G. V. LIEFFRING ET AL  3,464,631
APPARATUS FOR TREATING VEHICLE WASH WATER
Filed Oct. 23, 1967  2 Sheets-Sheet 1
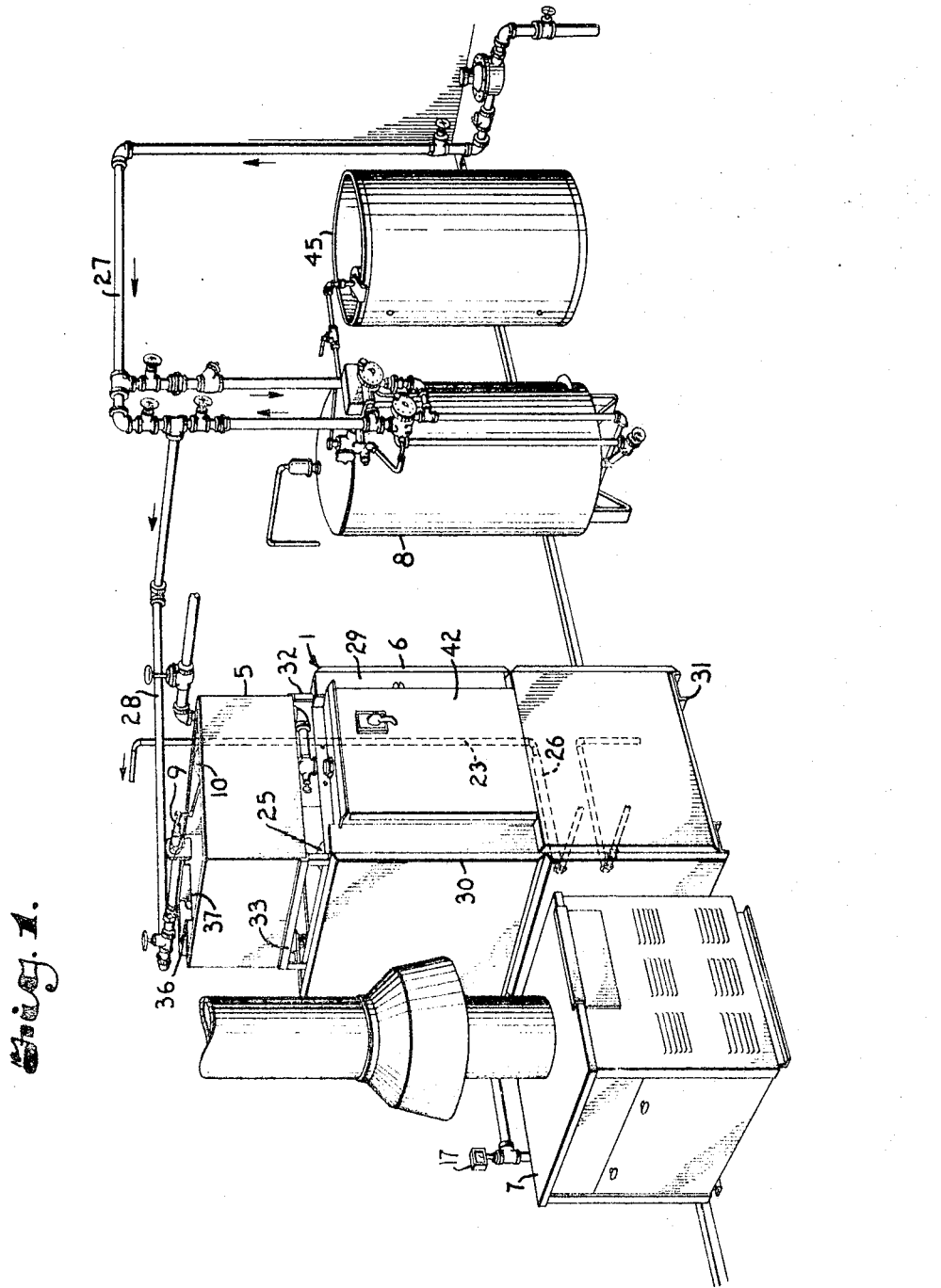
INVENTORS.
GORDON V. LIEFFRING,
JAMES E. WIDNER, and
BY KENNETH P. BEGEY
Fishburn, Gold and Litman
ATTORNEYS.

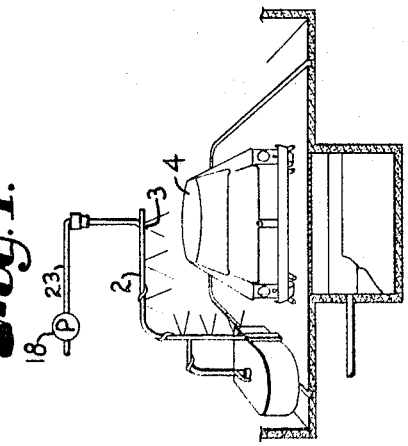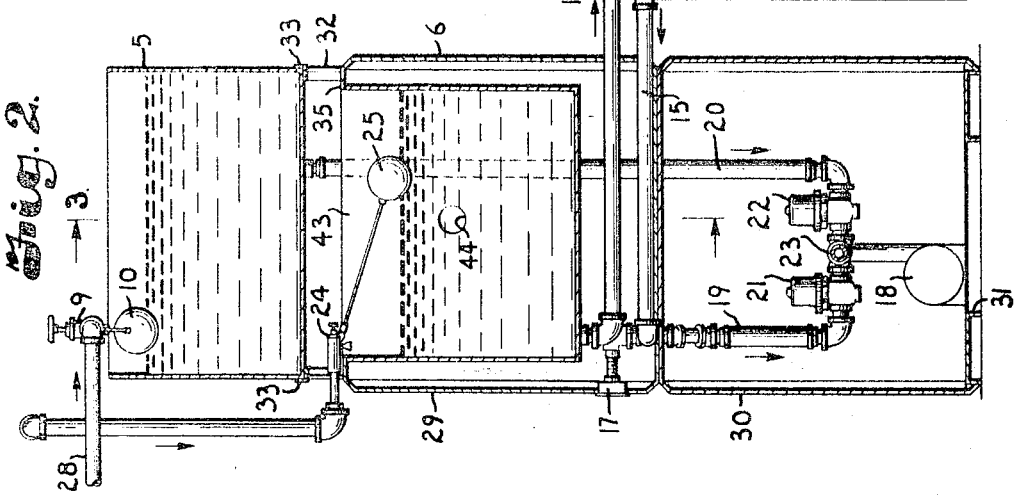

United States Patent Office 3,464,631
Patented Sept. 2, 1969

3,464,631
APPARATUS FOR TREATING VEHICLE
WASH WATER
Gordon V. Lieffring and Kenneth P. Begey, Kansas City, Mo., and James E. Widner, Prairie Village, Kans., assignors to Robo-Wash, Inc., Kansas City, Mo., a corporation of Missouri
Filed Oct. 23, 1967, Ser. No. 677,319
Int. Cl. B04b 1/24; B60s 3/00
U.S. Cl. 239—135                                11 Claims

ABSTRACT OF THE DISCLOSURE

Apparatus for treating vehicle wash water including a first source of clean water connected to a water softener and a second source of water connected to a heated water storage tank. A water heater and a recirculating pump cooperate to heat water pumped from the storge tank and maintain a selected water temperature in the heated water storage tank. Water from the water softener is stored in a softened water storage tank positioned directly above the heated water storage tank and used for rinse water in vehicle washing equipment and for make-up water in the heated water storage tank. The rinse water and the heated water are piped to a line which is connected to the vehicle washing equipment.

The principal objects of the present invention are: to provide apparatus for treating water for vehicle washing and rinsing without having high pressure on float valves in storage tanks; to provide positive circulation of wash and rinse water from storage tanks and a water heater to fluid spray equipment for washing and rinsing a vehicle; to provide apparatus for heating the wash water and maintainig the wash water at a selected temperature; to provide clean softened water for a rinse cycle and for make-up water for a heated water wash cycle; to provide a second source of water for the heated water storage tank; to provide control means for supplying the softened make-up water when a second source of water is cut off or inadequate; to provide such an apparatus factory installed in a minimum number of package units which require a minimum number of plumbing and electrical connections for installation; to provide such an apparatus that has long lasting operating parts, that is easily maintained, that is economical to manufacture and that is positive in operation.

Other objects and advantages of this invention will become apparent from the following description taken in connection with the accompanying drawings wherein are set forth by way of illustration and example certain embodiments of this invention.

FIG. 1 is a perspective view of water treating apparatus embodying features of the present invention.

FIG. 2 is a rear elevational view of the water storage and heating apparatus with water storage tanks shown in section.

FIG. 3 is a partial transverse sectional view of the tanks taken on line 3—3, FIG. 2.

FIG. 4 is a perspective view at a reduced scale showing spray apparatus for directing jets of washing and rinsing fluids against surfaces of a vehicle.

Referring more in detail to the drawings:

The reference numeral 1 generally designates apparatus for treating vehicle washing and rinsing fluids and delivering the treated fluids to spray apparatus 2 for directing jets 3 of the fluids against surfaces of a vehicle 4 to be washed. The apparatus 1 includes a first or cold water reservoir 5 positioned directly above a second or heated water reservoir 6 in a factory installed package unit and a water heater 7 connected to the heated water reservoir 6.

In the illustrated structure the cold water reservoir 5 is an open top tank having over-the-rim water supply from a water softener 8 which receives water from a suitable source. The water softener 8 is operative to deliver soft water to the first reservoir 5. A first or cold water float controlled means such as a first or cold water float valve 9 is operated by a float 10 and is responsive to the level of water in the cold water reservoir 5.

The heated water reservoir 6 is also an open top tank with over-the-rim supply from a pipe 11 connected to the bottom of the reservoir 5 and includes a second or heated water float controlled means 12 such as a float valve operated by a float 13 that is responsive to the level of water in the heated water reservoir 6. The pipe 11 is positioned for gravity flow of cold water from the first reservoir 5 to the second reservoir 6 and in the illustrated structure the second float valve 12 is positioned in the pipe 11 for controlling the flow and maintaining the level of water in the second reservoir 6.

The water heater 7 is operative to heat water for use in the spray apparatus 2 and is adapted for circulation of water between the heater 7 and the second reservoir 6. In the illustrated structure the heater 7 is connected to the second reservoir 6 by a heater inlet line or pipe 14 and a heater outlet line or pipe 15. A recirculating pump 16 is positioned in the heater inlet pipe 14 so it is not subjected to the temperature of the heated water from the heater. The pump 16 is operative to pump water from the second or heated water reservoir 6 to the water heater 7 and return heated water to the second reservoir 6. Suitable temperature gauges and controls 17 are positioned in the heater inlet pipe 14 and the heater outlet pipe 15 and control operation of the pump 16 and heater 7 to maintain the water in the second or heated water reservoir 6 at a selected temperature, such as 110° to 130° F., suitable for washing surfaces of the vehicle 4.

A suitable pump 18 moves hot water to the spray apparatus 2 from a hot water inlet line or pipe 19 which is connected to the heater outlet pipe 15 and to the reservoir 6. The pump 18 also moves cold water to the spray apparatus 2, the cold water being received from a cold water inlet line 20 which is connected to the first or cold water reservoir 5.

Suitable remote controlled valve means 21 and 22, such as solenoid valves, are positioned in the hot water inlet line 19 and the cold water inlet line 20 respectively and are operative to selectively permit water from the heated water reservoir 6 and the cold water reservoir 5 respectively to be pumped at high pressures by the pump 18 to the spray apparatus 2. In the illustrated structure a pump outlet line 23 connects the pump 18 to the spray apparatus 2.

A second source of water is connected to the heated water reservoir 6 and has a third float controlled means, such as a third float valve 24 with a float 25 responsive to level of water in the second reservoir 6. The second source of water may be any suitable source of treated and softened water, as for example reclaimed wash water from the spray apparatus 2 which has had suspended solids removed and has been softened, as for example, in an ion exchange unit or water softener (not shown).

In the illustrated structure the second float valve 12 and float 13 are positioned in the second reservoir 6 at a lower level than the third float valve 24 and float 25. The float 13 will close the valve 12 before the valve 24 is closed by the float 25 thereby using water from the second source to fill the second reservoir 6. In normal operation the second valve 12 will be closed, preventing cold water from the cold water reservoir 5 from entering the heated water reservoir 6. Water flows through the connecting pipe 11 only when water from the second source is cut off or inadequate to close the second float valve 12.

A high pressure vibration dampener 26 is positioned in the pump outlet line 23 adjacent the pump 18, whereby the jets 3 from the spray apparatus 2 are smooth flowing high pressure jets of wash and rinse water.

In the illustrated structure the first named source of water enters the apparatus 1 through a supply pipe 27 which is connected to the water softener 8. The water softener 8 is connected to the first or cold water reservoir 5 by a water softener outlet line 28 having the cold water float valve 9 therein.

In the preferred embodiment of the apparatus 1 the first reservoir 5 is positioned immediately above the second reservoir 6 and the cold water inlet line 20 is positioned adjacent the second reservoir 6. A housing 29 is positioned directly below the second reservoir 6 and encloses the pump 18, the remote controlled solenoid valves 21 and 22, and the high pressure vibration dampener 26.

A frame 30 supports the housing 29, the heated water reservoir 6 and the cold water reservoir 5 in a package unit. In the illustrated structure the frame 30 includes suitable base or floor members 31, such as structural beams or channels, and a plurality of upright corner and intermediate members 32, such as angles, extending upwardly from the floor members 31 to cold water reservoir supporting members 33. The second or heated water reservoir 6 is enclosed within a portion of the housing 29 with an upper edge or rim 34 of the second reservoir 6 being level with an upper edge 35 of the housing 29.

A cold water overflow tank 36 is mounted on one side of the cold water reservoir 5. Excess water flows from the cold water reservoir 5 over a weir 37 into the cold water overflow tank 36. An overflow outlet pipe 38 conveys the water from the tank 36 by gravity flow to a suitable sump or drain.

A heated water overflow tank 39 is mounted on one side of the heated water reservoir 6. Excess water flows from the heated water reservoir 6 over a weir 40 into the heated water overflow tank 39. An overflow outlet pipe 41 conveys the water by gravity flow to the same sump or drain as the overflow outlet pipe 38.

A control panel 42 is mounted on the housing 29 and is electrically connected with the spray apparatus 2, the solenoid valves 21 and 22, the pump 18, the recirculating pump 16, and various pumps associated with the water sources.

Suitable valves, such as gate and check valves, are positioned in the various pipes and lines, as shown in FIG. 1, to permit the operating parts to be removed, replaced and maintained and to control the flow through the apparatus 1.

In the illustrated structure a partition 43 is positioned in the heated water reservoir 6 to divide same into two compartments. The second float valve 12 and the float 13 are positioned on one side of the partition 43 with the third float valve 24 and the float 25 positioned on the opposite side of the partition 43. An opening 44 in the position 43 defines a passage for the water in the second reservoir 6 between the two compartments therein, thereby permitting the water level in the two compartments to be the same.

The water softener 8 must be regenerated or recharged periodically. In the illustrated structure a brine regenerant storage tank 45 is connected to the softener 8 and is operative to suitably recharge the softener 8.

Installation of the apparatus 1 is extremely simple, requiring only field plumbing connections to the water softener 8, to the water heater 7, to the spray apparatus 2 and to the second source of water. Electrical connections are also simplified due to the pump 18 and the solenoid valves 21 and 22 being factory installed in the housing 29.

In operation, water from the first source is piped to the water softener 8 which is operative to deliver soft water through the softener outlet line 28 to the first reservoir 5. Water from the second source is piped to the second reservoir 6. Water from the first reservoir 5 is used for rinse water in the spray apparatus 2 and for make-up water in the second reservoir 6 when water from the second source is inadequate to close the second float valve 12. Water from the second reservoir 6 is moved to and heated in the water heater 7 and pumped to the spray apparatus 2 or returned to and stored in the second reservoir 6 until the remote controlled solenoid valve 21 is activated to permit the pump 18 to move hot water to spray apparatus 2.

What we claim and desire to secure by Letters Patent is:

1. A vehicle wash apparatus having spray apparatus for directing jets of washing and rinsing fluids against surfaces of a vehicle comprising:
   (a) water softening means connected to a source of water and operative to deliver soft water from an outlet of said means,
   (b) a first water reservoir,
   (c) first float controlled means responsive to level of water in said first reservoir and connected to said soft water outlet for delivery of soft water to said first reservoir to maintain the water level therein,
   (d) a second water reservoir positioned below said first water reservoir,
   (e) second float controlled means responsive to level of water in said second reservoir for gravity flow of water from said first water reservoir to said second water reservoir to maintain the level therein,
   (f) a water heater,
   (g) means connecting said second water reservoir with said heater for circulation of water therebetween whereby operation of the heater heats said water, and
   (h) pump means having valve controlled inlet connections with said first and said second water reservoirs for selectively moving water from the respective reservoirs and an outlet communicating with the spray apparatus for water delivery to said spray apparatus for supplying said jets thereof to wash and rinse a vehicle.

2. The vehicle wash apparatus as set forth in claim 1 including:
   (a) a second source of water supply,
   (b) third float controlled means responsive to a level of water in said second reservoir and connected to said second source of water.

3. The vehicle wash apparatus as set forth in claim 2 including:
   (a) said second float controlled means being positioned in said second reservoir at a lower level than said third float controlled means whereby said water from said first water reservoir enters said second water reservoir only when water from said second source is inadequate to close said second float controlled means.

4. The vehicle wash apparatus as set forth in claim 1 wherein said means connecting said second water reservoir with said heater for circulation of water therebetween includes:
   (a) a first connection between said water heater and second reservoir, said first connection being a heater inlet,
   (b) a second connection between said water heater and said second reservoir, said second connection being a heater outlet,
   (c) a recirculating pump in said first connection, and
   (d) control means operative to maintain a selected temperature in said second reservoir.

5. The vehicle wash apparatus as set forth in claim 4 including:
   (a) a housing having said pump means positioned therein,
   (b) said second reservoir being arranged in said housing and positioned above said pump means,
   (c) a frame supporting said housing and said first reservoir and said second reservoir, said first reservoir being positioned over said second reservoir.

6. The vehicle wash apparatus as set forth in claim 5 including:
(a) said second connection between the heater and second reservoir having a connection to said pump means, and
(b) said connection being positioned in said housing, whereby water is moved from said second reservoir through said water heater to said spray apparatus at a selected temperature.

7. The vehicle washing apparatus as set forth in claim 6 including:
(a) a cold water inlet line between said first reservoir and said pump means, said cold water inlet line being positioned in said housing and adjacent said second reservoir.

8. The vehicle washing apparatus as set forth in claim 7 wherein:
(a) said valve controlled inlet connections each have a remote controlled solenoid valve positioned in said hot water inlet and in said cold water inlet line respectively, and
(b) said solenoid valves are in said housing and adjacent said pump means inlet.

9. In a vehicle wash apparatus, a package unit comprising:
(a) a frame having base members and upright members extending upwardly therefrom;
(b) a housing supported by and mounted on said frame,
(c) a water reservoir positioned in said housing:
(d) a second water reservoir positioned over said first named water reservoir and supported on said frame and being adapted to be connected to and receive water from a source of water;
(e) a cold water connection between said second water reservoir and said first named water reservoir adapted for gravity flow of water from said second water reservoir to said first named water reservoir;
(f) first float controlled means mounted in said second water reservoir and responsive to a level of water therein for delivery of water thereto;
(g) second float controlled means mounted in said first named water reservoir and positioned in said cold water connection with said second water reservoir and responsive to a level of water in said first named water reservoir for gravity flow of water from said second to said first named water reservoir;
(h) a first line and a second line connected to said water reservoir and extending outwardly from said housing and adapted to be connected to a water heater for circulation of water therebetween whereby operation of the water heater heats said water;
(i) pump means mounted in said housing and positioned below said first named water reservoir and having valve controlled inlet connections with said first named water and said second water reservoirs respectively for selectively moving water from said respective reservoirs and an outlet communicating with a point of use.

10. The package unit as set forth in claim 9 including:
(a) a cold water inlet line between said second water reservoir and said pump means, said cold water inlet line being positioned in said housing and adjacent said second water reservoir;
(b) said second line connected to said heated water reservoir having a hot water connection to said pump, said hot water connection being positioned in said housing whereby water is moved from said first named water reservoir through said water heater to said spray apparatus at a selected temperature;
(c) said valve controlled inlet connections being mounted in said housing and having a remote controlled solenoid valve positioned in said hot water connection and in said cold water inlet line respectively;
(d) said solenoid valves being positioned adjacent said pump means inlet.

11. The package unit as set forth in claim 10 including:
(a) third float controlled means mounted in said first named water reservoir and adapted to be connected to a source of water independent of said first named source of water and responsive to a second level of water in said first named water reservoir, said second level of water being above said first named level of water therein; and
(b) said third float controlled means being positioned in said first named water reservoir at a level above said second float controlled means whereby said water from said second water reservoir enters said first named reservoir only when water from said independent source is inadequate to close said second float controlled means.

References Cited
UNITED STATES PATENTS

| | | | |
|---|---|---|---|
| 2,987,259 | 6/1961 | Lindquist | 239—139 X |
| 3,017,122 | 1/1962 | Malsbary | 239—135 |
| 3,103,312 | 9/1963 | Damrow | 239—135 |
| 3,134,117 | 5/1964 | Frank et al. | 134—123 X |
| 3,226,030 | 12/1965 | Rossi | 239—135 |
| 3,346,191 | 10/1967 | Roach | 239—135 |
| 3,389,860 | 6/1968 | Null | 239—135 X |

ALLEN N. KNOWLES, Primary Examiner

U.S. Cl. X.R.

134—123